United States Patent

Haeuslmeier et al.

(10) Patent No.: US 6,913,284 B2
(45) Date of Patent: Jul. 5, 2005

(54) VEHICLE AIRBAG SYSTEM

(75) Inventors: Kurt Haeuslmeier, Munich (DE); Gisela Diepold, Gilching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 72 days.

(21) Appl. No.: 10/051,390

(22) Filed: Jan. 22, 2002

(65) Prior Publication Data

US 2002/0113421 A1 Aug. 22, 2002

(30) Foreign Application Priority Data

Jan. 20, 2001 (DE) .......................................... 101 02 646

(51) Int. Cl.[7] .......................... B60R 21/26; B60R 21/32
(52) U.S. Cl. ..................... 280/735; 280/736; 280/741
(58) Field of Search ................................. 280/735, 736, 280/741

(56) References Cited

U.S. PATENT DOCUMENTS

| 5,330,226 A | * | 7/1994 | Gentry et al. ............... 280/735 |
| 5,411,289 A | * | 5/1995 | Smith et al. ................. 280/735 |
| 5,460,405 A | * | 10/1995 | Faigle et al. ................. 280/735 |
| 5,582,428 A | * | 12/1996 | Buchanan et al. ........... 280/741 |
| 5,626,359 A | * | 5/1997 | Steffens et al. .............. 280/735 |
| 5,934,705 A | | 8/1999 | Siddiqui et al. |
| 6,056,079 A | | 5/2000 | Cech et al. |
| 6,572,142 B1 | * | 6/2003 | Iyoshi et al. ................. 280/737 |
| 2002/0050703 A1 | * | 5/2002 | Whang et al. ............... 280/737 |

FOREIGN PATENT DOCUMENTS

| EP | 0733519 | 9/1996 |
| EP | 0879739 | 11/1998 |
| EP | 0900702 | 3/1999 |

* cited by examiner

Primary Examiner—Paul N. Dickson
Assistant Examiner—George D Spisich
(74) Attorney, Agent, or Firm—Crowell & Moring LLP

(57) ABSTRACT

A vehicle airbag system has an airbag which can be deployed in two stages. In a typical accident situation, a first chamber containing a larger quantity of propellant charge is deployed, and a second chamber containing a smaller quantity of propellant charge is deployed after a delay. If a particular accident situation is detected, such as the out-of-position situation or other person-specific and accident-specific variables, a deployment control device decides whether the ignition sequence is optimal, and reverses the sequence if applicable. The delay can also be varied on the basis of the detected variables.

2 Claims, 2 Drawing Sheets

VEHICLE AIRBAG SYSTEM

BACKGROUND AND SUMMARY OF THE INVENTION

This application claims the priority of German Patent Document DE 101 02 646.3, filed Jan. 20, 2001, the disclosure of which is expressly incorporated by reference herein.

The invention relates to an airbag system for motor vehicles. The airbag system has an airbag and a deployment arrangement, which fills the airbag with gas when an event occurs that can be interpreted as an impact against an obstacle. The deployment arrangement includes two independently-deployable chambers, each of which is capable of filling the airbag. The first chamber may fill the airbag more fully than the second chamber. After the first chamber has been deployed, the second chamber is deployed with a time delay.

Airbag systems have become standard equipment for protecting motor-vehicle passengers in accidents. An acceleration sensor provided on the vehicle frame usually detects whether an abrupt deceleration of the vehicle is to be interpreted as an impact against an obstacle. In such a case, a folded-up airbag is filled with gas in fractions of a second through the deployment or ignition of a propellant charge in order to catch the passenger's body and thus protect it against sustained injuries.

Airbag systems of this type have performed well in practice. Vehicles of the upper-middle class, however, are already being provided with dual-stage airbag systems, in which the deployment arrangement comprises two chambers that contain an unequal distribution of the respective propellant charge. Conventionally, the propellant chamber with the larger quantity of propellant charge (e.g., 70%) is deployed first. After a delay, the chamber having the correspondingly smaller quantity of propellant charge (e.g., 30%) is deployed. It is known to make the time delay variable, notably as a function of the severity of the accident or crash as detected and assessed by appropriate sensors (EP 0 950 582 A2).

It has been seen that, for particular accident situations, these conventional airbag systems cannot ensure the optimum protection of the passengers in the involved vehicle. The passenger may be subjected to significant stress, especially a passenger in the so-called OOP (out-of-position) situation, in which his position differs from that of an average or standard passenger. In the OOP situation, the passenger is typically too close to the airbag system, for example due to a braking action that has occurred prior to the crash or impact. Non-belted children seated in the passenger seat are particularly at risk. They may be located directly in the expansion space of the passenger airbag. To offer protection to those passengers in the OOP situation in the event of an impact, it has already been proposed to place less propellant charge in the first chamber than in the second chamber (DE 195 51 0980.A1, EP 0 958 974 A2). This, however, is a drawback for a passenger in the average or standard position.

In view of this, it is the object of the present invention to disclose an airbag system that functions optimally for the affected passenger in any accident situation.

The invention uses sensors to detect numerous person-specific variables, especially accident-specific variables, such as the sitting position, weight, size, the locked position of the safety belt, etc. Typical accident-specific variables include the actual vehicle speed and the vehicle speed relative to a vehicle traveling in front of it, as well as the nature of the crash.

With these sensors, it is possible to implement the reversible ignition sequence of the propellant charges of the two chambers in accordance with the invention.

Other objects, advantages and novel features of the present invention will become apparent from the following detailed description of the invention when considered in conjunction with the accompanying drawing.

DETAILED DESCRIPTION OF THE DRAWING

The invention is described in detail below by way of the exemplary embodiment illustrated in the single drawing figure.

Figure 1:
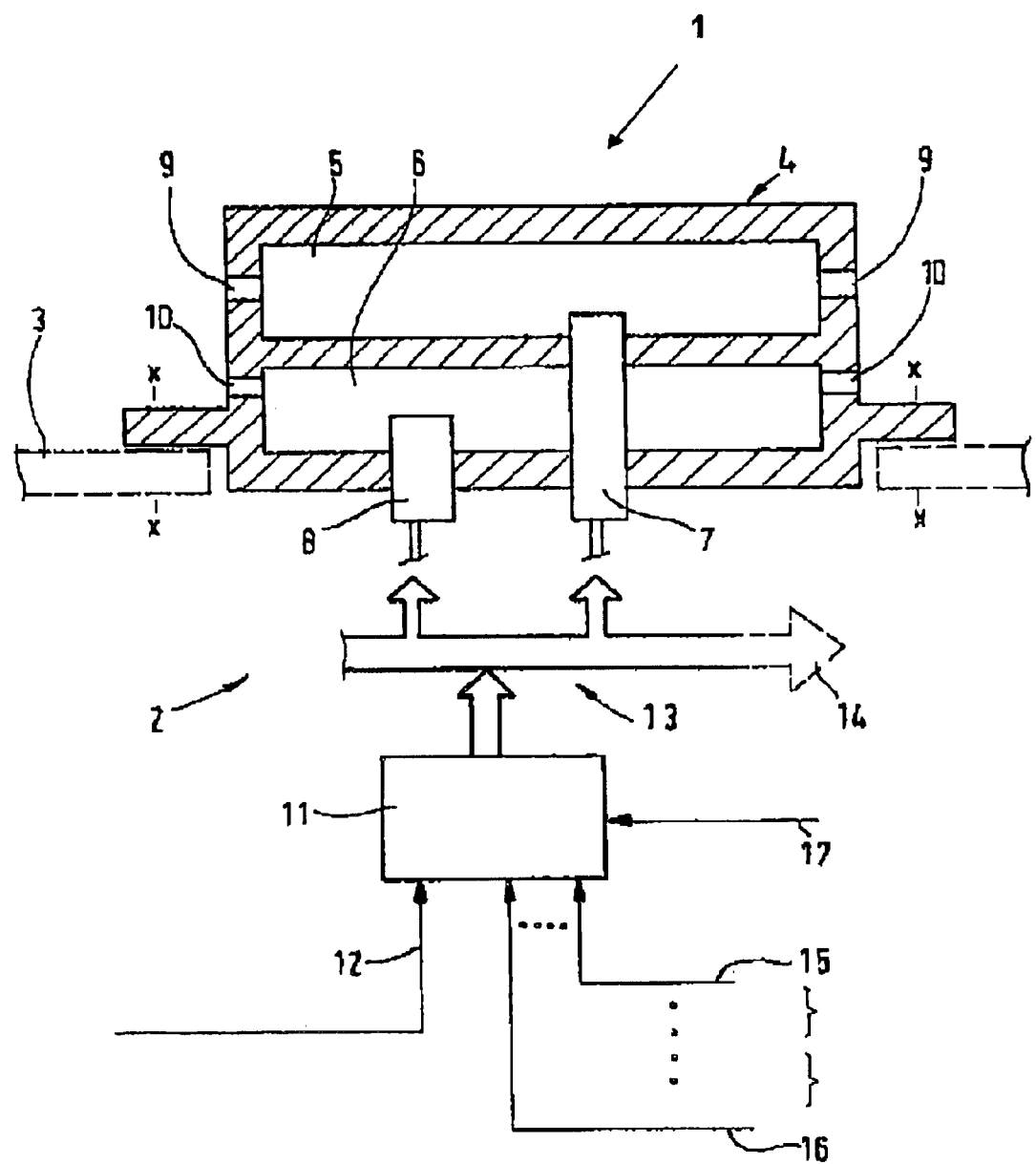
FIG. 1 is a schematic diagram showing the deployment arrangement of an airbag system of the present invention.
Figure 2:
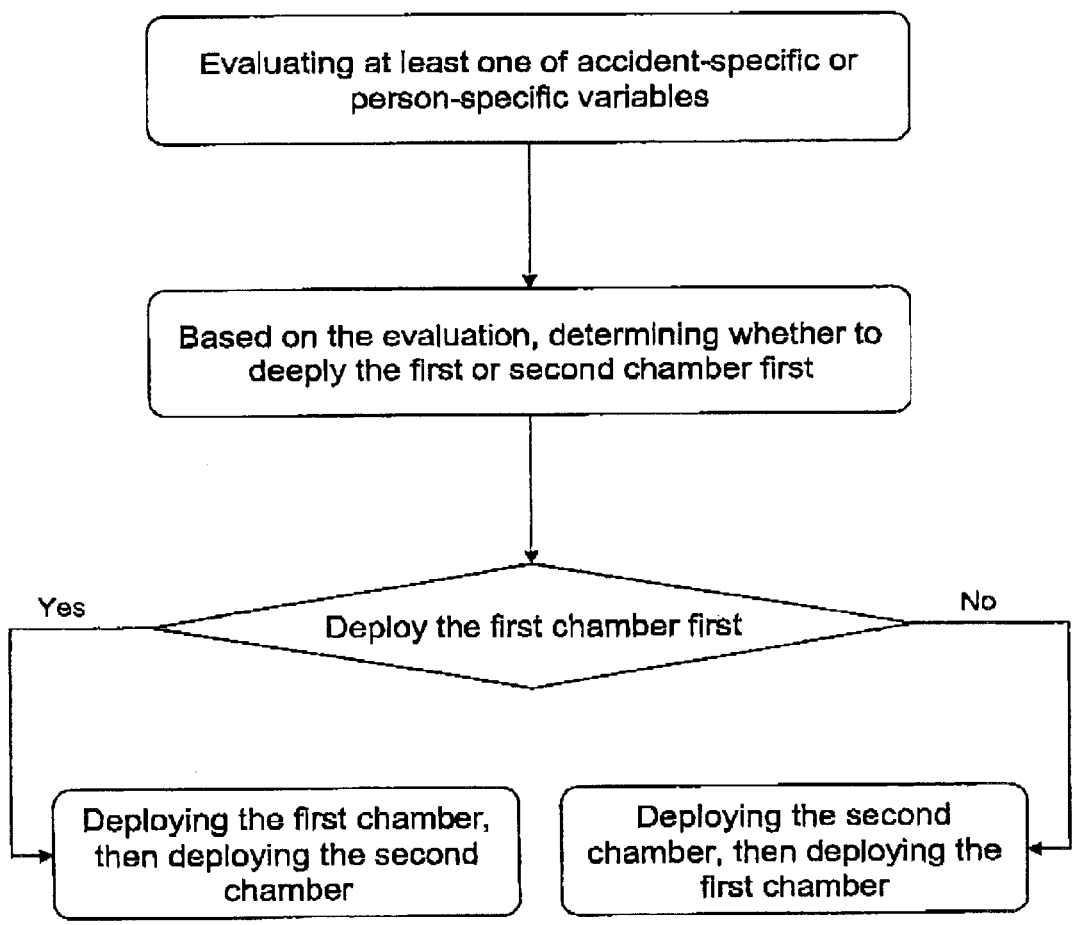
FIG. 2 shows a flow chart illustrating the operation of the airbag system of the present invention.

FIG. 1 schematically shows the deployment arrangement 2 of an airbag system 1, and FIG. 2 illustrates the operation of the airbag system. The airbag system 1 conventionally has a folded airbag, not shown, in a vehicle-side housing 3 indicated by dashed line. Secured in the housing is a deployment unit 4, which containing two separate chambers 5 and 6 for a respective propellant charge. The first chamber 5 can be deployed or ignited by way of a first ignition element 7 and the second chamber 6 can be deployed by way of a second ignition element 8, independently of an ignition of the first chamber 5. Each chamber 5, 6 has respective blowout openings 9 and 10.

A deployment control device 11 receives an acceleration signal 12 from an acceleration sensor, not shown, that is mounted to the vehicle frame. The control device 11 compares this signal to a threshold value stored inside the control device. If the threshold value is exceeded, the control device interprets the event that has effected this acceleration signal 12 as an impact, which triggers a rapid filling of the airbag with gas through the ignition of the propellant charges in the chambers 5 and 6. The threshold value is selected such that the airbag is not filled if emergency braking occurs.

In the illustrated case, the deployment control device 11 transmits a first ignition signal to the ignition element associated with the chamber containing the larger quantity of propellant charge. They are the first ignition element 7 and first chamber 5, respectively. Then, after a delay the control device 11 transmits an ignition signal to the second ignition element 8 for the smaller quantity of propellant charge in the second chamber 6. Consequently, the airbag is filled in two stages: first with the larger quantity of gas, then with the smaller quantity of gas in the end phase. A bus system 13 schematically represents the transmission of the ignition signals to the ignition elements 7 and 8. Dashed lines 14 show that further restraining systems such as belt tighteners, side airbags and the like can also be actuated in the same manner by the deployment control device 11 in the illustrated scenario.

The vehicle contains further sensors (not shown in detail) that detect variables associated with the passenger or the seats. One of such variables, for example, is the seat setting that is indicative of the sitting position and therefore the type of person. In other words, they detect whether the passenger is large or small. The sensors further detect a weight signal, i.e., whether the person is heavy or light in weight, and particularly whether a person is occupying the seat, and other such person-specific variables. A corresponding signal 15 is essentially transmitted to the deployment control device 11.

It is also advantageous to detect accident-specific variables. For example, the deployment control device 11 can be supplied with a signal 16 that indicates the crash angle, that is, the direction of the primary component of the force acting in an impact. This direction deviates from a specified axis, generally the longitudinal axis of the vehicle. It is further advantageous to detect the actual speed of the vehicle, the vehicle speed relative to an object located in front of the vehicle, typically another vehicle traveling ahead of the vehicle, and to transmit corresponding signals to the deployment control device 11. The deployment control device 11 is also supplied with specific variables relating to the vehicle type, or it permanently stores these variables, as indicated by a type signal 17. The accident-specific and person-specific variables supplied to the deployment control device 11 are evaluated in terms of the vehicle type in the deployment control device 11. Based on this evaluation, it is not only possible to select a variable time delay between the ignition of the two ignition elements 7 and 8, as is already known per se, but it can also be determined whether a particular accident situation is occurring in which it would be more practical to deploy the airbag containing the smaller quantity of gas first, then fill it with the larger quantity of gas following a delay. In the illustrated case, the corresponding signals are transmitted to the ignition elements 7 and 8 in reverse order, so the propellant charge in the second chamber 6 is ignited first. The larger quantity of propellant charge in the first chamber 5 is ignited after a corresponding delay.

The variable ignition sequence for the chambers 5 and 6 of the dual-stage deployment unit 4 allows the stress values of the passenger, which are adapted to the respective accident situation, to be reduced to more favorable values. This is especially crucial for the OOP situation. Furthermore, there are more possible degrees of freedom in optimizing the deployment of the airbag, notably with respect to an adaptation to any accident situations that may arise.

As of the year 2003, the FMVSS 208 regulation will stipulate tests for the OOP situation for the driver and passenger sides, especially for US vehicles.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An airbag system for a vehicle having sensors that detect an accident-specific variable and a person-specific variable, the system comprising:
   an airbag;
   a deployment arrangement adapted to fill the airbag with gas when the deployment arrangement interprets an event as an impact against an obstacle, the deployment arrangement including:
      independently deployable first and second chambers, the first chamber being capable of filling the airbag with a larger quantity of gas than the second chamber, wherein the deployment arrangement is configured to determine whether to deploy the first or second chamber first on the basis of an evaluation of the accident-specific variable and the person-specific variable, wherein the sensors include sensors for detecting an actual vehicle speed and a relative vehicle speed, and wherein the deployment arrangement is configured to determine whether to deploy the first or second chamber first on the basis of an evaluation of an crash angle and a crash severity, each of the crash angle and crash severity being determined as a function of vehicle type, the actual vehicle speed and the relative vehicle speed.

2. A method for deploying an airbag system for a vehicle having sensors that detect an accident-specific variable and a person-specific variable, the airbag system including airbag and a deployment arrangement adapted to fill the airbag with gas when the deployment arrangement interprets an event as an impact against an obstacle, the deployment arrangement including independently deployable first and second chambers, the first chamber being capable of filling the airbag with a larger quantity of gas than the second chamber, the method comprising:
   evaluating the accident-specific variable and the person-specific variable;
   determining whether to deploy the first or second chamber first using the accident-specific variable and the person-specific variable;
   deploying the first and second chambers in the determined sequence to fill the airbag with gas when the deployment arrangement interprets an event as an impact against an obstacle; and
   detecting an actual vehicle speed and a relative vehicle speed, and wherein evaluating the accident-specific variable and the person-specific variable includes evaluating an crash angle and a crash severity, each of the crash angle and the crash severity being determined as a function of vehicle type, actual vehicle speed and relative vehicle speed.

* * * * *